United States Patent
Lazar et al.

[11] 3,923,453
[45] Dec. 2, 1975

[54] NEW DYE COMPOSITIONS

[75] Inventors: Remus I. Lazar, Berwyn; Richard C. Reichel, Chicago, both of Ill.

[73] Assignee: Velsicol Chemical Corporation, Chicago, Ill.

[22] Filed: Dec. 3, 1973

[21] Appl. No.: 420,998

[52] U.S. Cl. ............................ 8/39; 8/42 R; 8/42 B; 8/93; 8/173
[51] Int. Cl.² .......................... D06P 1/20; D06P 5/04
[58] Field of Search.................. 8/93, 173, 39, 42 R Primary Examiner—Lewis T. Jacobs
Attorney, Agent, or Firm—Robert J. Schwarz; Dietmar H. Olesch

[57] ABSTRACT

This invention discloses a dye composition comprising one part by weight of an acid dyestuff and from one to twenty parts by weight of a dye assist consisting of a mixture of benzyl alcohol and

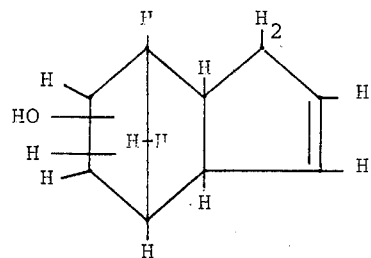

having a boiling point of about 117°C at 9 mm Hg pressure, a refractive index of about 1.5262 at 20°C and an infrared spectrum having strong bands at about 9.4, 10.1, 12.7 and 14.4 microns, in a weight ratio of from 4:1 to 1:4.

5 Claims, No Drawings

NEW DYE COMPOSITIONS

This invention relates to dye compositions which are useful in the dyeing of natural proteinaceous and synthetic polyamide fibers.

The art of dyeing is a complex procedure requiring a variety of techniques and chemicals. The dyeing of natural proteinaceous materials such as wool and silk and the dyeing of synthetic polyamides such as nylon is typically carried out by the use of acid dyes. Such dyes are usually not used by themselves but are used in combination with a dye assist. The use of a dye assist results in a substantial improvement in the uniformity of the dyeing as well as an increase in the depth or saturation of color achieved. Thus, the use of a dye assist permits the obtainment of a particular depth of color with a lower concentration of dye.

U.S. Pat. No. 3,634,016 discloses numerous compounds which are useful as dye assists. It has now been found that a particular mixture of two of these compounds in combination with an acid dyestuff results in a dye composition which yields color intensities in natural and synthetic fibers unobtainable with the individual compounds at the same concentration.

Accordingly, an embodiment of the present invention resides in a dye composition comprising one part by weight of an acid dyestuff and from one to 20 parts by weight of a dye assist consisting of a mixture of benzyl alcohol and

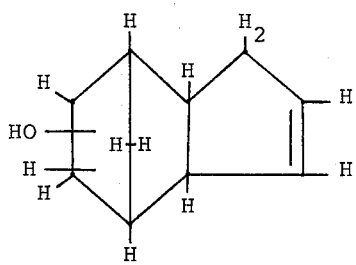

having a boiling point of about 117°C at 9 mm Hg pressure, a refractive index of about 1.5262 at 20°C and an infrared spectrum having strong bands at about 9.4, 10.1, 12.7 and 14.4 microns, in a weight ratio of from about 4:1 to 1:4.

The compound of the structural formula set forth above will hereinafter be referred to as dicyclopentyl alcohol and can be prepared as described by Bruson and Reiner, JACS 67, p. 723. A further elucidation of the structure of this compound is discussed by Bartlett and Schneider, JACS 68, p. 6.

The new dye assists of the present invention are particularly useful in the dyeing of natural and synthetic fibers utilizing dyestuffs normally termed "acid dyes." The term "acid dyes" encompasses three types of dyestuffs, i.e., the simple acid dyes, mordant acid dyes and premetalized acid dyes.

The simple acid dyes fall into various chemical types such as nitro, as exemplified by CI Acid Yellow 1 (C.I. No. 10316); monoazo, as exemplfied by CI Acid Red 1 (C.I. No. 18050); diazo, exemplified by CI Acid Red 89 (C.I. No. 23910); nitroso, exemplified by CI Acid Green 1 (C.I. No. 10020); monoazo, exemplified by CI Acid Orange 72 (C.I. No. 18740); triphenylmethane, exemplified by CI Acid Blue 7 (C.I. No. 42080); xanthrene, exemplified by CI Acid Violet 9 (C.I. No. 45190); anthraquinone, exemplified by CI Blue 45 (C.I. No. 63010); azine, exemplified by CI Acid Blue 59 (C.I. No. 50315); and quinoline, exemplified by CI Acid Yellow 3 (C.I. No. 47005).

The mordant acid dyes similarly fall into several chemical types, such as anthraquinone, exemplified by CI Mordant Red 3 (C.I. No. 58005); monoazo, exemplified by CI Mordant Red 7 (C.I. No. 18760); diazo, exemplified by CI Mordant Brown 1 (C.I. No. 20110); oxazine, exemplified by CI Mordant Violet 50; xanthene exemplified by CI Mordant Red 15; triphenylamine, exemplified by CI Mordant Blue 1 (C.I. No. 43830); nitroso, exemplified by CI Mordant Green 4; and naphthoquinone, exemplified by CI Mordant Brown 7.

The premetalized acid dyes are also divided into several types:

1:1 Metal complex dyes with sulfonic acid groups for solubility, exemplified by the Palatine Fast and the Neolan dyes; 1:1 metal complex with colorless complex builders but without sulfonic acid groups, exemplified by the Neopalatine dyes; 1:2 metal complex dyes with solubilizing gropus, exemplified by Polar Grey BL; 1:2 metal complex neutral dyes, exemplified by Irgalan Grey BL (C.I. Acid Black 58).

The dye compositions of the present invention are particularly useful in the dyeing of natural proteinaceous fibers such as silk and wool and in the dyeing of synthetic polyamide fibers such as nylon. The actual procedures for applying the dye compositions to the fibers are identical to the standard procedures used in the dyeing of proteinaceous and polyamide fibers using standard acid dye formulations. For example, the dye composition can be applied by printing, padding or spraying onto the fabric, or by means of an immersion operation. The actual process conditions, such as temperature, pH, etc., are substantially the same as those employed in the art.

Similarly, the dye compositions of this invention can contain other additives normally used in dyeing with acid dyes. For example, thickeners such as methyl cellulose or natural gums are useful in many applications. Other auxiliary materials can also be used such as sodium sulfate, ammonium acetate, ammonium phosphate, methyl and ethyl lactate, methyl and ethyl tartrate, formic acid, acetic acid, hydrochloric acid, sulfuric acid and the like. In addition to the abovementioned additives, emulsifiers or surfactants can be used in the dye compositions of the instant invention. Typically anionic or nonionic surface active agents in an amount of from about 5 to about 25 weight percent of the dye assist can be suitably employed.

For practical use in dyeing fibers the dye compositions of this invention are incorporated into aqueous dye baths. Such dye baths can be prepared by first dissolving the acid dyestuff in hot water. Thickening agents, pH adjusters or buffers and other desired additives can then be added to the dye solution. Thereafter the dye assist in combination with a surface active agent can be added to form the finished dye bath. Typically, such dye baths contain from about 0.01 to 4.0 percent by weight dye and from about 1 to about 5 percent by weight dye assist. As previously indicated the particular dye assist mixture of this invention results in a higher saturation of color obtainable from a given concentration of dye than is possible with the use of the individual components alone. This increase in color is particularly substantial at lower concentrations of dyestuff in the dye bath such as those ranging from 0.01 to 1.0 percent by weight of the dye bath.

The amount of thickening agent used varies with the particular application and dyeing equipment used. Typically the thickening agent is present from about 0.25 to about 3.0 percent by weight of the total dye bath.

The dyeing compositions of this invention and their application are more specifically illustrated in the following examples.

EXAMPLE 1

Preparation of CI Acid Black 58 Dye Compositions

A series of CI Acid Black 58 dye compositions containing varying amounts of dye assist were prepared by the following procedure. CI Acid Black 58 dye (2.0 grams; Irgalan Grey BL, a product of Ciba Geigy Corp.) was combined with sufficient water (10 ml) to form a paste. Water (488 ml) at a temperature of about 212°F was added to the dye paste to form a solution. A 1.0 percent by weight of aqueous xanthan gum dispersion (500 ml; Kelzan, a product of Kelco Co.) was then added to the dye solution with stirring to provide a homogeneous blend. Formic acid (30 grams) was then added to adjust the pH of the solution. Varying amounts of a mixture of dicyclopentyl alcohol, benzyl alcohol and Atlox 3406 F emulsifier (a polyethylene derivative blended with alkyl aryl sulfonates produced by Atlas Chemical Industries) in a weight ratio of 42.5:50:7.5 parts respectively were then added to yield aqueous dye compositions containing the following percentages by weight of ingredients. The percent dye assist represents the combination of dicyclopentyl alcohol, benzyl alcohol and emulsifier.

| Formulation No. | 1A | 1B | 1C | 1D |
|---|---|---|---|---|
| CI Acid Black 58 | 0.2 | 0.2 | 0.2 | 0.2 |
| Xanthan Gum | 0.5 | 0.5 | 0.5 | 0.5 |
| Formic Acid | 3.0 | 3.0 | 3.0 | 3.0 |
| Dye Assist | 1.0 | 2.0 | 3.0 | 4.0 |

EXAMPLE 2

Preparation of CI Acid Orange 64 Dye Compositions

A series of CI Acid Orange 64 (Capracyl Yellow 3RD, a product of DuPont Corp.) dye compositions containing varying amounts of dye assist were prepared by the procedure detailed in Example 1. The compositions contained the following percentages of ingredients.

| Formulation No. | 2A | 2B | 2C | 2D |
|---|---|---|---|---|
| CI Acid Orange 64 | 0.5 | 0.5 | 0.5 | 0.5 |
| Xanthan Gum | 0.5 | 0.5 | 0.5 | 0.5 |
| Formic Acid | 0.0 | 0.0 | 0.0 | 0.0 |
| Dye Assist | 1.0 | 2.0 | 3.0 | 4.0 |

EXAMPLE 3

Preparation of CI Acid Red 182 Dye Compositions

A series of CI Acid Red 182 (Supralan Bordeau, a product of GAF Corp.) dye compositions containing varying amounts of dye assist were prepared by the procedures detailed in Example 1. The compositions contained the following percentages of ingredients.

| Formulation No. | 3A | 3B | 3C | 3D |
|---|---|---|---|---|
| CI Acid Red 182 | 0.5 | 0.5 | 0.5 | 0.5 |
| Xanthan Gum | 0.5 | 0.5 | 0.5 | 0.5 |
| Formic Acid | 2.0 | 2.0 | 2.0 | 2.0 |
| Dye Assist | 1.0 | 2.0 | 3.0 | 4.0 |

EXAMPLE 4

Preparation of CI Acid Blue 25 Dye Composition

A series of CI Acid Blue 25 (Alizarine Supra Blue A, a product of GAF Corp.) dye compositions containing varying amounts of dye assist were prepared by the procedures detailed in Example 1. The compositions contained the following percentages of ingredients.

| Formulation No. | 4A | 4B |
|---|---|---|
| CI Acid Blue 25 | 0.5 | 0.5 |
| Xanthan Gum | 0.5 | 0.5 |
| Formic Acid | 2.0 | 2.0 |
| Dye Assist | 2.0 | 4.0 |

The efficiency of the combination of benzyl alcohol and dicyclopentyl alcohol as a dye assist and their unexpected property of intensifying the color obtained in dyeing fibers with a given concentration of acid dyes was demonstrated in experiments wherein the color intensity of this combination achieved in dyeing woven nylon fibers was determined and compared to the color intensity achieved with identical dye formulations utilizing either benzyl alcohol or dicyclopentyl alcohol alone at the same concentrations.

In these experiments swatches of knitted nylon 6 fiber were dipped into each of the dye compositions prepared in Examples 1 to 4. Fabric swatches were also dipped into identical compositions except that in place of the dye assist combination of this invention benzyl alcohol and dicyclopentyl alcohol alone were present. The dipped nylon swatches were then passed between two rubber rollers to squeeze out excess dye formulation and to achieve an approximately 100 percent addition by weight of the dye liquor to the nylon swatch. The nylon swatches were then fixed by exposing them to saturated steam at atmospheric pressure for a period of from about 5 to about 15 minutes. The swatches were then washed in water at room temperature and air-dried.

A color intensity scale was established for each of the dyes used in the dye compositions of this invention. Dye compositions were prepared under optimum conditions with each of the dyes in accordance with procedures described in Example 1 except that no dye assist was used. The pH of these compositions was adjusted for individual dyes to obtain optimum color stability and wash fastness. Dye compositions of each of the colors were prepared utilizing 0.2, 0.5, 1.0, 2.0, 3.0 and 5.0 percent by weight of the dye. Nylon 6 knitted fabric swatches were then dyed by the procedure detailed above to obtain standard nylon swatches of increasing color intensity. The dyed swatches were then given as the color intensity value the percentage number of the dye in the dye composition with which they were dyed. Thus, the color intensity value of any dyed swatch represents the amount of dye required, without the use of dye assist, to obtain a particular intensity of color.

Since an increase in the dye concentration results in a deeper and more intense color the lower values represent lighter, less intense colors and the higher values represent darker and more intense colors.

The standard color intensity swatches were used to rate the effectiveness of the dye compositions of the present invention utilizing as the dye assist the combination of benzyl alcohol and dicyclopentyl alcohol as well as the efficiency of dye compositions containing either benzyl alcohol or dicyclopentyl alcohol alone. This rating was effected by comparing the color intensity of dyed nylon 6 swatches with the color intensity of the standard swatches. Each of the dyed swatches was given a color intensity value equivalent to that of a standard swatch having the same or the closest color intensity. In-between values were assigned by visual estimation. The results of these comparisons are set forth in the following tables.

TABLE I

CI ACID BLACK 58 DYE COMPOSITION

| Formulation No. | Concentration of Dye Assist | Color Intensity Value | | |
|---|---|---|---|---|
| | | Benzyl Alcohol + Dicyclopentyl Alcohol | Benzyl Alcohol | Dicyclopentyl Alcohol |
| 1A | 1.0 | 0.3 | 0.3 | 0.3 |
| 1B | 2.0 | 0.5 | 0.3 | 0.3 |
| 1C | 3.0 | 0.7 | 0.4 | 0.4 |
| 1D | 4.0 | 1.1 | 0.5 | 0.4 |

TABLE II

CI ACID ORANGE 64 DYE COMPOSITION

| Formulation No. | Concentration of Dye Assist | Color Intensity Value | | |
|---|---|---|---|---|
| | | Benzyl Alcohol + Dicyclopentyl Alcohol | Benzyl Alcohol | Dicyclopentyl Alcohol |
| 2A | 1.0 | 0.8 | 0.4 | 0.4 |
| 2B | 2.0 | 1.6 | 0.5 | 0.5 |
| 2C | 3.0 | 2.5 | 0.8 | 0.5 |
| 2D | 4.0 | 3.0 | 2.0 | 0.5 |

TABLE III

CI ACID RED 182 DYE COMPOSITION

| Formulation No. | Concentration of Dye Assist | Color Intensity Value | | |
|---|---|---|---|---|
| | | Benzyl Alcohol + Dicyclopentyl Alcohol | Benzyl Alcohol | Dicyclopentyl Alcohol |
| 3A | 1.0 | 2.5 | 0.9 | 1.5 |
| 3B | 2.0 | 4.2 | 1.4 | 2.5 |
| 3C | 3.0 | 4.5 | 2.4 | 2.8 |
| 3D | 4.0 | 4.5 | 4.5 | 2.2 |

TABLE IV

CI ACID BLUE 25 DYE COMPOSITIONS

| Formulation No. | Concentration of Dye Assist | Color Intensity Value | | |
|---|---|---|---|---|
| | | Benzyl Alcohol + Dicyclopentyl Alcohol | Benzyl Alcohol | Dicyclopentyl Alcohol |
| 4A | 2.0 | 1.2 | 0.8 | 0.9 |
| 4B | 4.0 | 2.5 | 1.7 | 1.2 |

It can be seen from the foregoing data that substantially greater color intensities can be obtained with the dye compositions of the present invention than those resulting from the use of identical compositions containing either benzyl alcohol or dicyclopentyl alcohol alone at the same concentrations.

We claim:

1. A dye composition comprising one part by weight of an acid dyestuff and from one to 20 parts by weight of a dye assist consisting of a mixture of benzyl alcohol and

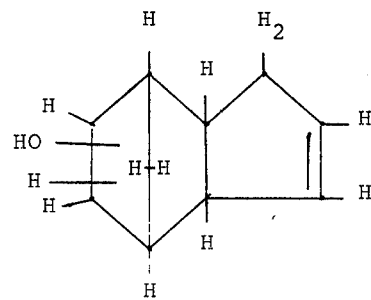

having a boiling point of about 117°C at 9 mm Hg pressure, a refractive index of about 1.5262 at 20°C and an infrared spectrum having strong bands at about 9.4, 10.1, 12.7 and 14.4 microns, in a weight ratio of from 4:1 to 1:4.

2. The composition of claim 1, wherein the dyestuff is CI Acid Black 58.

3. The composition of claim 1, wherein the dyestuff is CI Acid Orange 64.

4. The composition of claim 1, wherein the dyestuff is CI Acid Red 182.

5. The composition of claim 1, wherein the dyestuff is CI Acid Blue 25.

* * * * *